Figure 3:
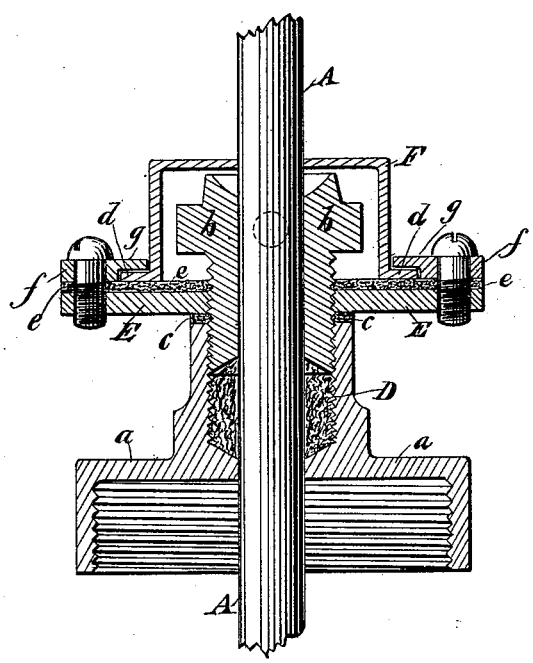

(No Model.) 2 Sheets—Sheet 1.
T. J. IVANS.
PUMP.
No. 402,835. Patented May 7, 1889.
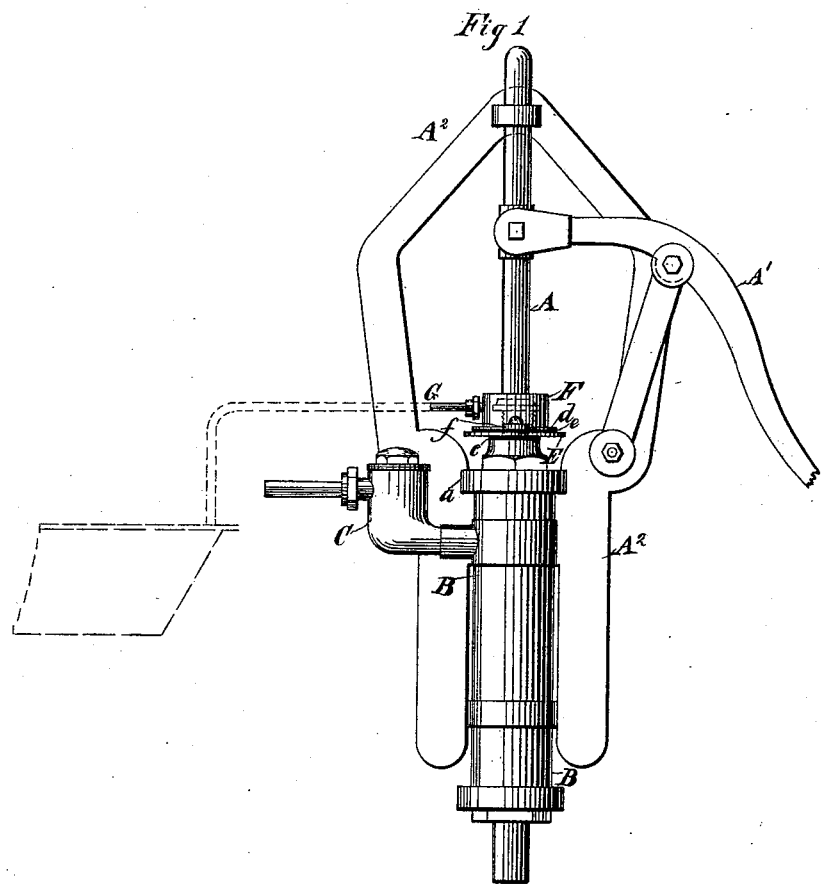
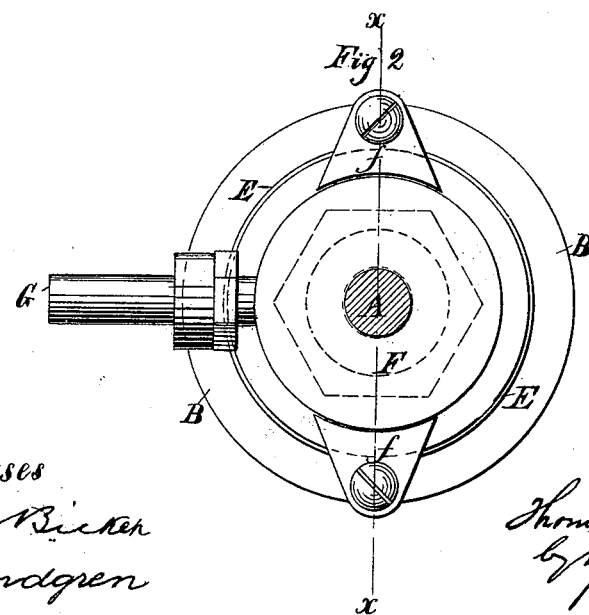
Witnesses
John Bicker
O. E. Sundgren
Inventor,
Thomas J. Ivans
by his Attorneys
Brown & Griswold (No Model.)  
2 Sheets—Sheet 2.

T. J. IVANS.
PUMP.

No. 402,835.  Patented May 7, 1889.

Witnesses  
Inventor:

UNITED STATES PATENT OFFICE.

THOMAS J. IVANS, OF NEW YORK, N. Y.

PUMP.

SPECIFICATION forming part of Letters Patent No. 402,835, dated May 7, 1889.

Application filed February 11, 1889. Serial No. 299,374. (No model.)

*To all whom it may concern:*

Be it known that I, THOMAS J. IVANS, of the city, county, and State of New York, have invented a certain new and useful Improvement in Pumps, of which the following is a specification.

Heretofore great difficulty has been experienced in disposing of the overflow of water drawn by the piston-rod through the stuffing-box surrounding the chamber during the operation of the pump. It is the object of my improvement to overcome this difficulty.

In the accompanying drawings I have shown my improvement as applied to a reversible force-and-lift pump of ordinary construction; but it may be applied to pumps of other description.

Figure 1 is a side elevation of a force-and-lift pump embodying my improvement. Fig. 2 is a plan or top view thereof, the frame being removed and the piston-rod being shown in section. Fig. 3 is a vertical section, taken on the line $xx$ of Fig. 2, showing my improvement as applied to the stuffing-box.

Similar letters of reference designate corresponding parts in the several figures.

A designates a piston-rod operated by a handle, A', fulcrumed upon a frame, A².

B designates the chamber of the pump. Within the chamber is arranged a piston-valve of ordinary construction and not shown in the drawings. The chamber is provided with an outlet-conduit, C. The piston-rod works through a stuffing-box, D, formed within a screw-threaded cap, $a$, which cap engages the upper end of the chamber B. The upper portion of the stuffing-box is closed by a nut, $b$, in a well-known manner. Through this nut the piston-rod also plays.

E designates a plate, which plate is provided with a central aperture screw-threaded to engage the nut $b$. In assembling the parts the nut is first passed downwardly to the desired point through the plate E and into the stuffing-box, and the plate E is then rotated until it is tight, and will then act as a nut-lock to prevent the accidental loosening of the nut $b$. I have shown a washer, $c$, between the plate E and the upper end of the stuffing-box.

F designates a shell, somewhat in the form of an inverted cap, provided at its lower edge with a horizontally and circumferentially extending flange, $d$. This shell is provided about centrally upon its upper side with an aperture through which the piston-rod A may play. The cap is placed over the nut $b$, so that its flange $d$ rests, in the present instance, upon a washer, $e$, arranged upon the plate E. In order to secure the shell F to the plate E, I employ securing devices $f$, shown as consisting of metal pieces rabbeted upon their under sides in such manner as to form lips or flanges $g$, which, when the securing devices are in place, will extend over the flange $d$ on the shell F. Clamps, here shown as screws passing through suitable apertures in the securing devices $f$ and engaging screw-threaded holes in the plate E, may be used to draw the securing devices and the said plate together, thus seating the shell F firmly upon the washer $e$ and forming a water-tight joint. The shell F, thus placed, forms a chamber into which all the water drawn up by the piston-rod through the stuffing-box will be received. Extending from the side of the shell I have shown a waste-pipe, G, which waste-pipe may lead to a sink, as shown in dotted outline in Fig. 1, or to any other receptacle, as desired; or it may connect with the waste-pipe of a house.

It will be observed that the securing devices $f$ are separate from the shell F. By this construction the shell F may be, when the securing devices are loosened, rotated to bring the waste-pipe G into any desired position which may be necessary in order to accommodate it to the position in which the pump may be erected.

It will be seen that by my improvement a very effective means, as well as an inexpensive and durable one, is provided for collecting the overflow from the piston and conveying it away. The outside of the pump may, therefore, be kept dry and avoid rust, while at the same time water will not be dripping down upon the floor below.

What I claim as my invention, and desire to secure by Letters Patent, is—

1. In a pump, the combination, with a chamber and a piston-rod, of a stuffing-box comprising a nut through which said piston-rod plays, a plate screw-threaded upon said nut, a shell detachably secured to said plate, said shell constituting a chamber into which the upper portion of said nut extends, and a waste-pipe leading from said chamber, substantially as specified.

2. In a pump, the combination, with a chamber and a piston-rod, of a stuffing-box comprising a nut through which said piston-rod plays, the plate E, screw-threaded upon said nut, the shell F, the washer e between said shell and the plate, the securing device f, and the waste-pipe G, substantially as specified.

THOMAS J. IVANS.

Witnesses:
 FREDK. HAYNES,
 ARTHUR H. GAMBLIN.